May 9, 1967 P. A. FOUCAULT 3,318,579
APPARATUS FOR MIXING FLOURY MATERIALS SUCH AS PLASTER
Filed Dec. 21, 1964 3 Sheets-Sheet 2

INVENTOR
Pierre Alexandre Foucault
By Stevens, Davis, Miller & Mosher
Attorneys

May 9, 1967    P. A. FOUCAULT    3,318,579
APPARATUS FOR MIXING FLOURY MATERIALS SUCH AS PLASTER
Filed Dec. 21, 1964    3 Sheets-Sheet 3
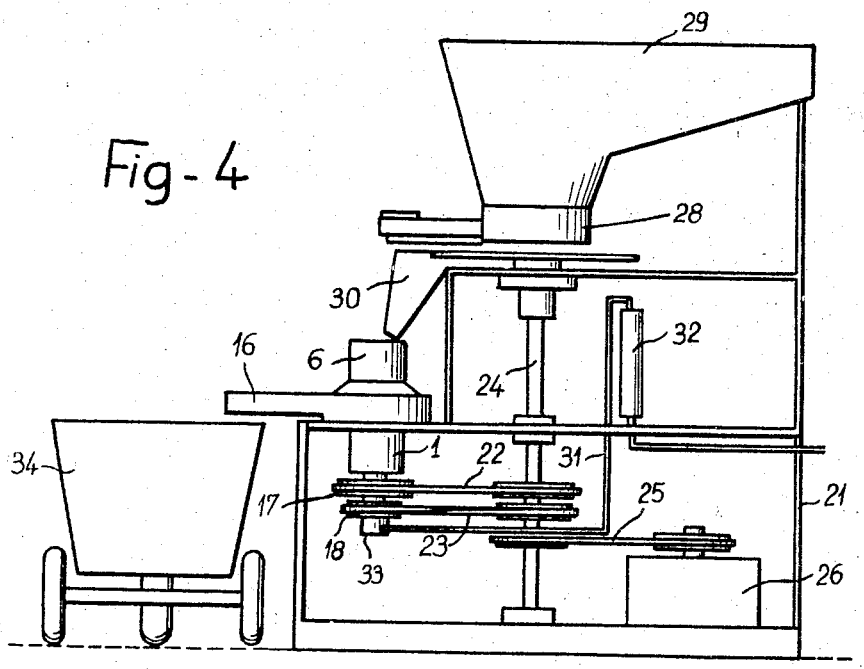
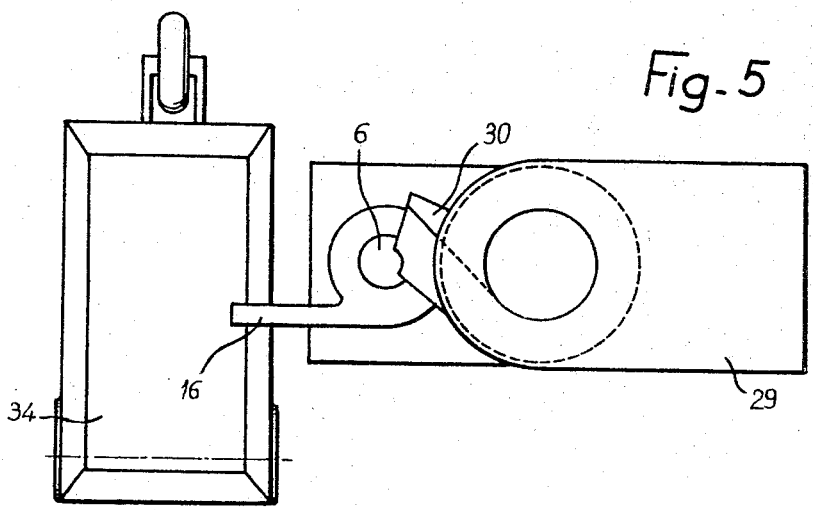

United States Patent Office
3,318,579
Patented May 9, 1967

3,318,579
APPARATUS FOR MIXING FLOURY MATERIALS
SUCH AS PLASTER
Pierre Alexandre Foucault, 5 Rue de Saint Cyr,
Marly-le-Roi, France
Filed Dec. 21, 1964, Ser. No. 419,878
Claims priority, application France, Dec. 23, 1963,
958,273, Patent 1,455,028
6 Claims. (Cl. 259—6)

For the mixing or intimate association of floury products with water (or other liquid medium) it is known to utilize mixing methods and apparatus in which the fluor and the water and, when so required, additional products are conveyed together in laminary passages for the purpose of achieving a homogeneous mixture of an emulsive nature.

The present invention relates to mixing apparatus of this kind, applied more particularly but not exclusively to the plaster industry, and which make it possible to obtain, not only an emulsive mixture of the plaster in water (going, if so required, as far as an instantaneous reduction to paste), but also greatly improved characteristics of the plasters employed and of the products manufactured, at the same time achieving considerable economy in manufacture and construction.

These advantages are especially substantial when, following modern techniques, the plasters receiver addition products intended to modify the setting conditions of the plasters or the characteristics of the products or elements of construction, for example of moulded elements to be obtained. The distribution of these addition products in the mixture of plaster and water is much more intimate and the action of the additives is much more effective.

The apparatus according to the invention is mainly characterized by the fact that the plaster (or other flour) and water (or other liquid medium) are pre-mixed by an intimate conjunction and inter-penetration level with or just upstream of the laminary passage in which they are forced to travel by mechanical means.

Other characteristic features of the invention consist principally of the following points:

(a) The laminary passage is formed between two circular elements which are given a relative movement with respect to each other and which, in conjunction with judiciously placed directing blades, cause at the same time the positive drive and the highly intimate mixture of the plaster and the water and, when so applicable, of the addition products;

(b) The inter-penetration is advantageously effected axially at the outlet of a gun, of which an axial fluid-intake tube delivers through orifices above a distributing head for the plaster, means (pressure, blades, etc.) being provided for priming and forcing the mixture towards the laminary passage;

(c) This laminary passage is annular and is formed between a fixed annular portion and a moving annular portion which are coaxial with the gun and the distributing head;

(d) The movable annular portion is independent of the gun;

(e) The gun and this moving annular portion are rotatably mounted and preferably rotate independently of each other and in opposite directions;

(f) Homogenity is obtained in a fixed annular chamber in which blades mounted on the movable annular portion are adapted to move;

(g) Regulating means are provided for modifying the working conditions at will: quantities of plaster and water, size of the laminary passage, speed of the rotating elements, etc.;

(h) The apparatus may be provided, depending on the applications, with accessory devices; for example as regards plasters, the outlet of the flow of paste can be extended by a flexible tube supplying a manual projection apparatus, and by various regulating apparatus as has already been proposed in a patent application filed jointly in France on May 16, 1963, by the applicant and Madame Veuve Madeleine Godard, nee Bonnamy, under the title, "A Method of and Apparatus for the Preparation and Application of Special Plasters."

Other characteristic features of the invention will further become apparent from the description which follows below, reference being made to the accompanying diagrammatic drawings, in which FIG. 1 is an axial cross-section through one example of construction of an instantaneous mixing device according to the invention;

FIGS. 4 and 5 are diagrammatic views, in elevation and in plan respectively, of an example of application to mixing, when so required with instantaneous reduction to paste, of special plasters for the building industry.

Figure 1:
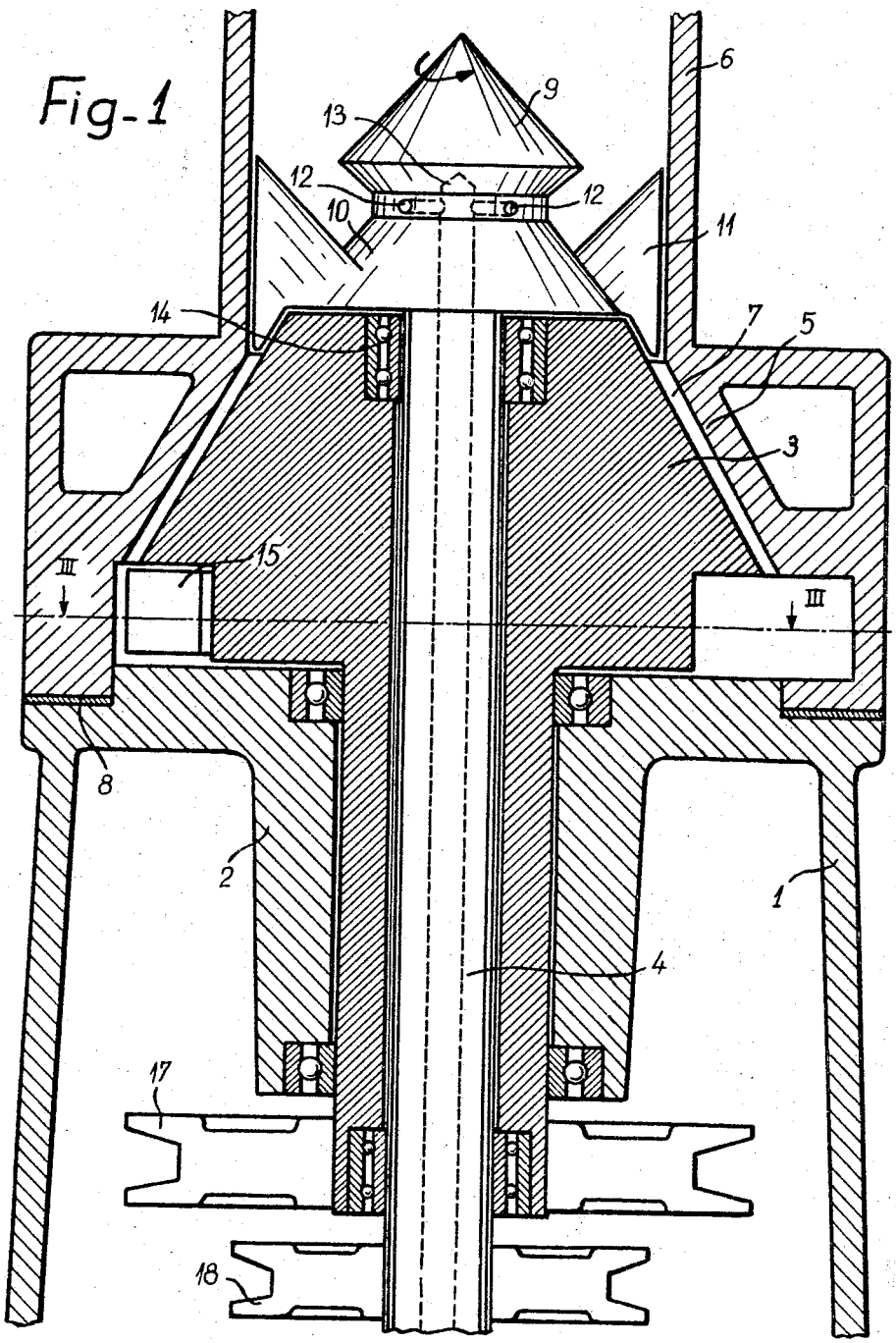
Figure 2:
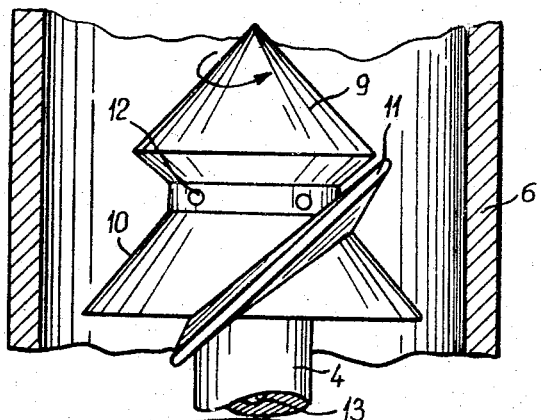
FIGS. 2 and 3 are corresponding detail views, the latter in cross-section, taken along the line III—III of FIG. 1.
Figure 3:
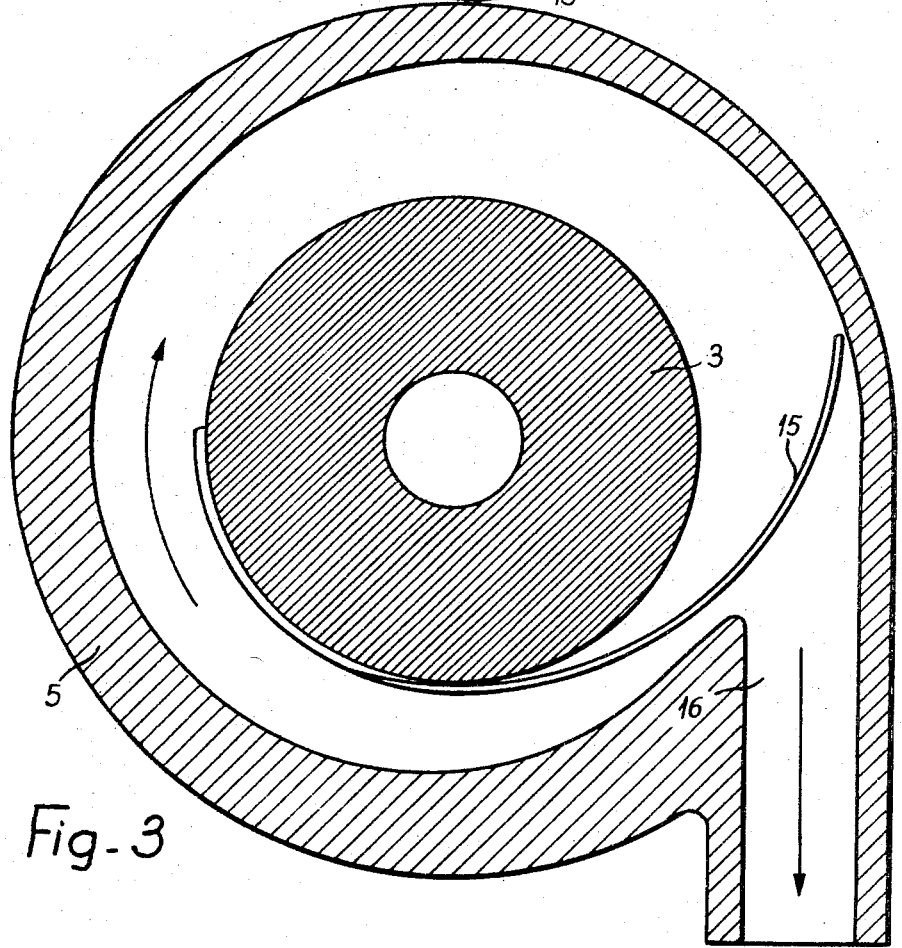

With reference to FIG. 1, a base-support 1 carries, through the intermediary of two bearings 2, a movable annular throttle portion 3, in a bore of which is mounted a gun 4 (FIGS. 1 and 2), which is not shown in the sectional view of FIG. 3. A fixed annular throttle portion 5 (FIGS. 1 and 3) is fixed on the support 1 with, at its upper portion, an intake chimney 6 for the powder to be mixed, such as plaster. Between the moving annular cone 3 and the fixed annular portion 5, there is thus formed an annular throttling space 7, of which the width (uniform or otherwise) is preferably adjustable, for example by means of joints 8 of different thicknesses between the base 1 and the fixed portion 5.

The gun 4 terminates at its upper portion in a conical distributor head 9 for the powder to be worked, this head being housed in the bottom portion of the chimney 6. A conical base 10 of the head of the part 4 comprises one or a plurality of blades 11 in the form of a propeller, which scrape the wall of the chimney 6 and which, by their inclination, compress the mixture so as to facilitate its passage through the space 7.

Radial orifices 12 form a communication between the fluid-intake tube 13 in the gun and the mixing chamber formed at the base of the chimney 6.

The gun 4 which carries the distributor head is mounted in the example shown through the intermediary of bearings 14 on the moving portion 3.

Blades 15 (FIGS. 1 and 3) are arranged at the base of the moving throttle portion 3, so as to force the throttled mixture towards the flow delivery 16.

Pulleys 17 and 18 (or other transmission devices) transmit rotation to the gun 4 and to the moving portion 3 from an appropriate driving system 26 (FIG. 4) of any kind. In the example shown, the gun 4 and the moving throttle portion rotate in opposite directions.

Referring to FIGS. 4 and 5, the mixing device proper 1 is adapted for the manufacture of treated plaster.

To this end, the apparatus 1 is mounted on a fixed or moving frame 21. The pulleys 17 and 18 (FIGS. 1 and 4) are driven by belts 22 and 23 which receive their movement from a vertical shaft 24 which is in turn driven by a transmission 25 from an engine or motor 26 of any kind. The vertical shaft 24 actuates the distributor 28 located at the base of a hopper 29 containing the plaster to be worked. The hopper delivers by a spout 30 into the chimney 6 of the mixing apparatus.

The water reaches the base of the fluid-intake tube 13 through a conduit system 31, on which is mounted a flowmeter 32. A rotary joint 33 of any kind permits the entry of water to the intake conduit 13.

The operation is obvious:

The water arriving in regulated quantity at 31 (FIG. 4) and 13 (FIG. 1) passes out through the orifices 12 and inter-penetrates the plaster which falls in regulated quantity from the spout 30 (FIG. 4) on to the distributor head 9 (FIG. 1). The mixture of water and plaster is forced by the rotation and by the blades 11 into the throttle passage 7.

This results in a very intimate mixture and, when so desired, in an instantaneous reduction of the plaster to paste, which is forced by the rotation and by the blades 15 towards the outlet 16 of the apparatus.

The mixed plaster is collected for example in a trolley 34 or again in moulds (not shown) for the production of pre-fabricated constructional elements.

It may also be delivered to a distance and projected on a wall as indicated in the description of the above-mentioned patent application, arrangements being then made so that the worker carrying out the projection can regulate the conditions of working according to the characteristics of the products treated and those of the products to be obtained.

It will of course be understood that the example of construction which has been described and shown is in no way limitative either in its applications or in its constructional alternative. In particular, without departing from the scope of the invention, it is possible to modify in any appropriate manner the number, the form, the nature and the mounting of the various elements. The apparatus need not be rotary but may be constituted by co-ordinated intake conduits under high pressures of the flours and the fluids, with the presence of mixing and homogenizing chambers, suitably disposed. The conduits may be of decreasing sections or may be formed in spirals, etc. A combination of rotating systems with fixed conduits and chambers is also possible.

I claim:

1. A device for mixing at least two constituents, comprising a housing having a vertical frusto-conical chamber and a vertical round casing coaxial with said chamber and extending thereabove, the end of said chamber having the smaller diameter registering with the lower end of said casing; a frusto-conical member rotatably mounted in said chamber and defining therewith a throttle passage extending between said member and said chamber; a frusto-conical hub rotatably mounted in said casing and providing an extension of said frusto-conical member; at least one helicoidal blade fixed to said hub and extending, with a small clearance, to said casing; said hub having a head portion the top of which has an oblique guide surface so that a powdered constituent introduced into the casing is distributed and deflected obliquely downwards in the direction of the wall of the casing and of the blade; a plurality of liquid outlet orifices extending through the bottom portion of said head; a first vertical hollow shaft extending through said frusto-conical member and being fixed to said hub; means to pass a liquid constituent through said hollow shaft and said orifices; and means to rotate said first shaft and said frusto-conical member independently to effect the mixing of said constituents.

2. The device of claim 1 wherein the top of the portion of said hub is frusto-conical.

3. The device of claim 1 wherein the bottom portion of said frusto-conical chamber and said frusto-conical member each terminate in a cylindrical portion defining an annular homogenizing chamber, the bottom portion of said chamber further having an outlet orifice substantially tangential to said annular chamber; and further comprising at least one blade fixed to the bottom portion of said frusto-conical member for delivering the mixed constituents towards said outlet orifice.

4. The device of claim 3 further comprising a second vertical hollow shaft extending from the bottom portion of said frusto-conical member and rotatably mounted in said housing, said first shaft extending in the hollow portion of said second shaft.

5. The device of claim 4 wherein said means to rotate said first shaft and said frusto-conical member comprises a drive means, and a transmission means operatively connecting said drive means to said first shaft and to said second shaft.

6. The device of claim 1 wherein the width of said throttle passage is adjustable.

References Cited by the Examiner

UNITED STATES PATENTS

| | | | |
|---|---|---|---|
| 1,459,657 | 6/1923 | Dempsey | 259—178 |
| 1,855,548 | 4/1932 | Forster | 259—8 |
| 2,498,209 | 2/1950 | Iredale | 259—8 |
| 2,639,901 | 5/1953 | Teale | 259—8 |
| 3,163,402 | 12/1964 | Yamashita | 259—6 |

WALTER A. SCHEEL, *Primary Examiner.*

R. W. JENKINS, *Assistant Examiner.*